Jan. 3, 1939.                N. A. LAURY                2,142,855
SULPHURIC ACID CONTACT PROCESS
Filed July 28, 1933
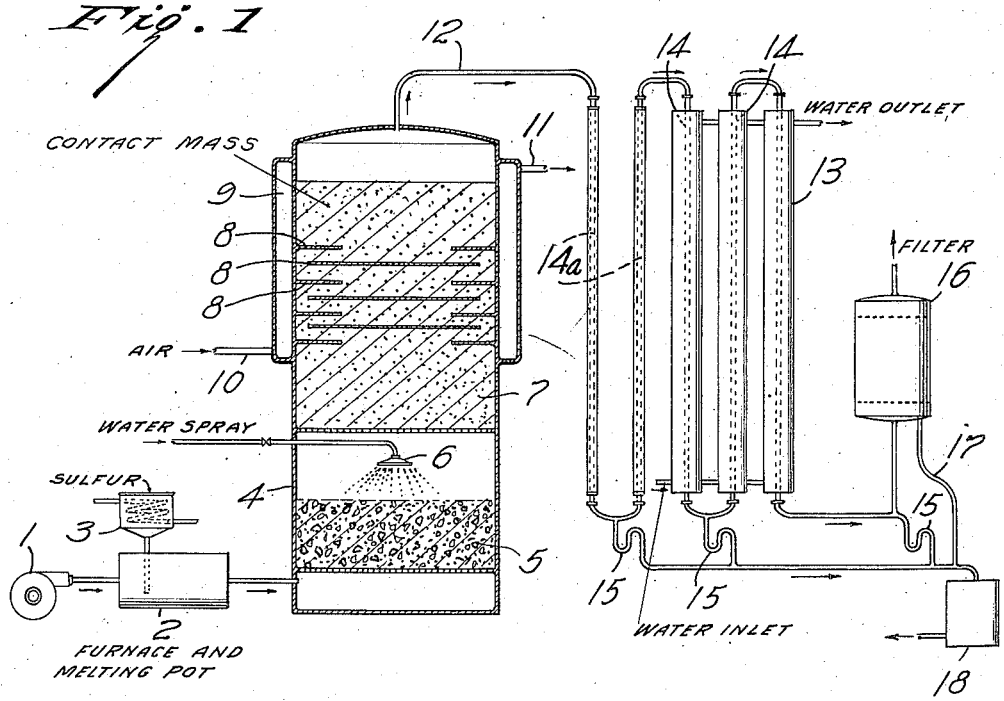
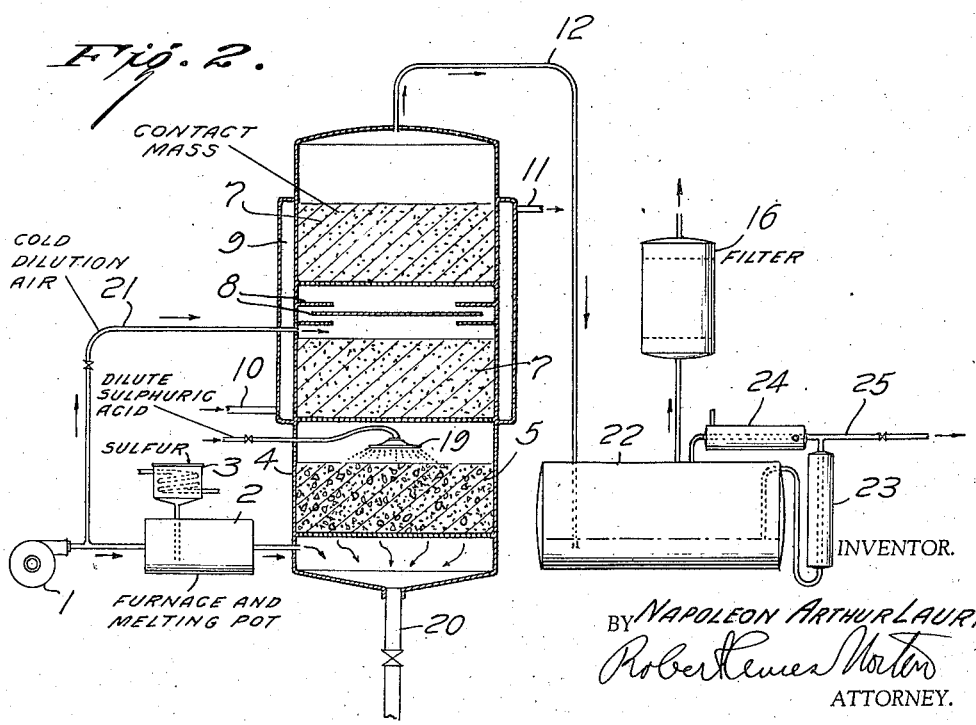
INVENTOR.
BY NAPOLEON ARTHUR LAURY
ATTORNEY.

Patented Jan. 3, 1939

2,142,855

UNITED STATES PATENT OFFICE 2,142,855

SULPHURIC ACID CONTACT PROCESS

Napoleon Arthur Laury, Bound Brook, N. J., assignor to The Calco Chemical Company, Inc., Bound Brook. N. J., a corporation of Delaware Application July 28, 1933, Serial No. 682,573

3 Claims. (Cl. 23—175)

This invention relates to a contact sulphuric acid process and apparatus therefor.

In the past sulphuric acid has been made by the contact process in rather elaborate equipment. This equipment has normally included not only a sulphur burner or equivalent source of $SO_2$, converter and $SO_3$ absorbing or condensing apparatus, but has required a drying tower for drying the air admitted to the burner and coolers to reduce the temperature of the $SO_2$ gases produced before entering the converter. The absorption system normally used is also rather elaborate, requiring the circulation of large quantities of strong sulphuric acid to absorb the $SO_3$ obtained by conversion. Usually some type of $SO_3$ cooler has also been necessary. This elaborate equipment is not a very serious disadvantage in very large installations where the first cost of the plant is not so large an item in the final cost of the acid. In small units, for example, units of 10 tons or less, the first cost is a very serious item. Moreover there is a demand for portable or semi-portable contact sulphuric acid plants and this demand has hitherto never been filled because the elaborate cooling and drying system necessitated by the ordinary contact process rendered the equipment size and weight prohibitive.

The present invention overcomes the disadvantages of prior processes and apparatus by a complete elimination of any $SO_2$ cooler with its attendant cost and maintenance difficulties due to corrosion. Drying towers for the air used in burning sulphur or sulphur-containing material are also eliminated. The present invention is based on the fact that it is necessary in making sulphuric acid to add water to the $SO_3$, produced by the contact process. According to this present process this water is added to the $SO_2$ gases before they pass through the contact mass. While the addition of water in pounds is not great, 18 pounds of water being required for each 80 pounds of $SO_3$ or even somewhat less if the air used in burning sulphur is not quite dry, the latent heat of vaporization of water and the specific heat of the steam produced are so high that adequate cooling is effected.

This process goes directly contrary to the common practice in the art where it was thought necessary to eliminate practically every bit of moisture from the gases passing through the contact mass. I have found that at the temperature of conversion, water does not harm the contact mass, particularly when a vandadium contact mass is employed. The present invention, therefore, instead of keeping the gases as dry as possible, deliberately adds all of the water required in the formation of the desired strength of acid before the gases pass through the contact mass. While in its broader aspects the invention is not limited to any particular method of vaporizing water into the $SO_2$ gases, in general, two modifications are most effectively used. The first modification which is particularly applicable to small units of maximum compactness and especially for portable units or semi-portable units, sprays the measured quantity of water into the $SO_2$ gases as they pass through a suitable packing, for example, a layer of flint pebbles. The water is entirely evaporated and the equipment required is very small and compact. Where, however, maximum compactness is not essential and particularly where the process of the present invention is to be used in conjunction with a plant which requires the concentration of considerable quantities of dilute sulphuric acid, which is normally the case with oil refineries, the concentration of the dilute sulphuric acid can be combined with humidifying and cooling of the $SO_2$ gases, thus utilizing the heat of combustion of the $SO_2$, which has to be eliminated anyhow, to effect acid concentration. Such combined concentration and humidification process may employ the most varied type of apparatus such as open pans exposed to the $SO_2$ gases, direct contact of the gases with the acid, as, for example, in a suitably packed tower and the like. Where such a combined process is used a very efficient and economical plant results because the fuel which would be necessary for concentrating acid is entirely or partially eliminated.

The present process in which all of the water, or a large part of the water, is added to the gases before they pass through the converter, results in an exit gas from the converter which when cooled down is liable to result in the formation of sulphuric acid mist. The ordinary type of $SO_3$ absorber is therefore not suitable and I prefer to use either a drum type absorber or a condensing system coupled, if necessary, with a suitable mist filter which may be of the packed filter box or electrostatic type. Such absorption or condensation systems are much more compact than the ordinary $SO_3$ absorber and the effectiveness of the process for small compact units, particularly portable units, is greatly enhanced.

In some cases a slight decrease in conversion efficiency may be noted due to the presence of the water which decreases to some extent the oxygen and $SO_2$ concentration. This requires a slightly larger amount of catalyst than would normally be needed in a converter unit of given capacity but as vanadium catalyst and even modern platinum catalyst is comparatively cheap, the additional amount of catalyst which may be required where the maximum conversion efficiency is desired does not materially increase the installation cost and is, of course, insignificant in comparison to the cost of elaborate design of cooling equipment required in the usual contact sulphuric acid process.

The converter may be cooled in any suitable manner to take care of the temperature rise of the gases due to the exotherm of the reaction between $SO_2$ and oxygen. The temperature rise will, of course, be less than in the ordinary converter because of the presence of the water vapor with its high specific heat. But nevertheless a rise will take place and unless suitable cooling is provided the conversion equilibrium will suffer. Any suitable cooling means may be employed such as, for example, air jackets around the outside of the converter. Another method is to introduce some cold air into the gases after they have passed through a portion of the catalyst, cooling them and also raising oxygen conventration for the final clean-up in the latter portions of the contact mass.

While the present process is not limited to the use of any particular catalyst, very effective results are obtained by the use of a catalyst prepared by impregnating calcined diatomite brick chips with vanadyl sulphate and potassium sulphate. Such a type of catalyst being described in my Patent No. 1,862,825 dated June 14, 1932. Other highly efficient vanadium catalysts are described in the patents to A. O. Jaeger, No. 1,675,308, dated June 26, 1928; No. 1,675,309, dated June 26, 1928, and No. 1,694,123, dated December 4, 1928.

The invention will be described in greater detail in connection with the drawing in which Fig. 1 shows an elevation of a plant (partly in section) and Fig. 2 shows an elevation (partly in section) of a combined contact and acid concentration plant.

In the modification shown in Fig. 1 air, which is not dried, is blown from the blower 1 into the combustion furnace 2 where molten sulphur from the sulphur melting pot 3 is fed in. The hot $SO_2$ gases pass into the bottom of the converter 4 and flow up through a layer of flint pebbles 5 in countercurrent to a spray of water from a nozzle 6. The amount of water is calculated so that the gases contain sufficient water to unite with $SO_3$ formed later on to produce the desired strength of acid.

The humidified gases pass on upwardly through the contact mass 7 which is provided with baffles 8, and the exotherm of the reaction is removed through the converter shell by the air jacket 9 provided with cooling air inlet 10 and cooling air exit 11.

The gases, in which from 95–98% of the $SO_2$ has been converted into $SO_3$, then pass through pipe 12 into a condenser system 13. This condenser system preferably consists of a first air-cooled unit of fused silica pipes 14a, followed by a series of pipes 14 each surrounded by a water jacket and provided with acid drain off traps 15 at their bottom. Most of the $SO_3$ and water which unite to form sulphuric acid are condensed out but a small residue of fine sulphuric acid mist remains and this is removed by passing the gases through a filter 16 which may be packed with coke or kieselguhr fragments. The condensed mist flows down through the pipe 17, joining the acid from the condensers and flowing into the acid storage tank 18.

The condensation equipment may be of "Duriron" but preferably the tubes of at least the first portion of the condenser are of fused silica or provided with other types of acid-proof lining, since the hot sulphuric acid which condenses in these tubes, tends to corrode the iron unless considerable care is taken.

The plant above described is extremely compact and lends itself easily to portable construction; thus a unit producing 5 tons of sulphuric acid per day can be built on the chassis of a large truck. The only connections required are for steam in the sulphur melting pot, electricity for the blower and water for the cooling. It should be understood, of course, that the amount of cooling water may be considerable because the heat of combustion of $SO_2$ is not removed by spraying in water. It is merely transformed into latent heat of steam at a lower temperature, and all of the heat, which is not removed by the converter cooling jacket or by radiation from the rest of the equipment, particularly the first tube of the condenser which may be air cooled, has to be taken out by the condenser water.

The plant illustrated in Fig. 2 is provided with a blower, melting pot and furnace of the same type as in Fig. 1, the same parts bearing the same numerals. The converter is of the same general design but is provided with an acid spray 19 instead of a water spray 6 and a valved pipe 20 is provided in the bottom of the converter to draw off the concentrated acid. The contact mass is also divided into two portions separated by baffles and a portion of the air from the blower is by-passed through the pipe 21, mixing with partly converted $SO_2$ gases between the two contact masses.

Instead of providing a condenser to receive the converted gases leaving through pipe 12, a drum type absorber 22 is utilized in which cool acid is circulated by means of the air lift 23, the cooling taking place in a water jacketed cooler 24. A mist filter 16 of the same design as in Fig. 1 is likewise provided. The acid of the desired strength is drawn off from the condenser circulating system, through the draw off pipe 25.

In operation dilute sulphuric acid which is to be concentrated, is sprayed in through the nozzle 19, flowing over the pebbles 5 in countercurrent to the stream of hot gases. A portion of the water of the acid is evaporated lowering the temperature of the $SO_2$ gases and the hot concentrated acid passes out through pipe 20 where, if desired, it may be used as circulating acid in the absorber 22. The lower part of the converter shell, of course, must be provided with suitable acid-proof lining.

A considerable portion of the cooling in the conversion is effected by the cold dilution air 21 and in some cases it may not be necessary to provide air jacket 9, although for larger units such a jacket is desirable.

Instead of spraying the dilute acid to be concentrated directly into the $SO_2$ gas stream, it may pass through suitable acid-proof pipes which are heated by the $SO_2$ gases and the steam evolved mixed with said gases, or any other suitable method of effecting concentration by means of the heat of the $SO_2$ gases can be employed and is included in the present invention.

Condensation systems for the $SO_3$ and water are shown in both figures and are preferred as they give the best results, particularly in small units. If desired, however, the present invention may be combined with an acid absorber of the usual type. However, while it is an advantage of the invention that it is sufficiently flexible to be used with this type of equipment, normally better results are obtained by using a condenser or its equivalent, a drum type absorber, as equipment cost is reduced and a more compact plant is obtained.

What I claim is:

1. A contact sulphuric acid process which comprises burning sulphur containing material to form a hot $SO_2$ containing gas, lowering the temperature of the gas to a range suitable for vapor phase catalytic conversion of $SO_2$ to $SO_3$ solely by contacting the gas directly with a water containing liquid and thereby evaporating water into the gas, the amount of water being sufficient to unite with the $SO_3$ producible by oxidizing the $SO_2$ to give the desired strength of sulphuric acid, and passing the gases at reaction temperature and in the vapor phase over a contact sulphuric acid catalyst which is insensitive to moisture at reaction temperatures.

2. A method of producing sulphuric acid by the contact process which comprises burning sulphur containing material with air to produce a hot sulphur dioxide gas mixture, lowering the temperature of the gases to those suitable for vapor phase catalytic conversion solely by introducing a water containing liquid into the hot gas under conditions and in such amounts that the gas after humidification will contain at least 1 mol. of steam for each mol. of sulphur dioxide, passing the resulting gas mixture directly to a sulfuric acid contact mass which is insensitive to moisture at reaction temperatures, converting the $SO_2$ in the gas to $SO_3$ by a vapor phase catalytic oxidation, and condensing the resulting mixture of steam and sulphur trioxide under conditions such that the water reacts with the sulphur trioxide to form sulphuric acid.

3. A combined process of producing contact sulphuric acid and concentrating dilute sulphuric acid which comprises burning a sulphur containing material to form hot $SO_2$ gases, lowering the temperature of the gases to those suitable for vapor phase catalytic conversion solely by injecting dilute sulphuric acid into the hot $SO_2$ gases under conditions resulting in the evaporation of at least a part of the dilute acid, the amount of water thereby evaporated being sufficient to unite with the $SO_3$ producible by oxidizing the $SO_2$ to give the desired strength of sulphuric acid, passing the humidified gases at said conversion temperature and in the vapor phase through a sulphuric acid contact mass which is insensitive to moisture at reaction temperatures, and forming sulphuric acid from the $H_2O$ and $SO_3$ in the converted gases by cooling and recovering said acid.

NAPOLEON ARTHUR LAURY.